(12) United States Patent
Staley et al.

(10) Patent No.: US 7,424,058 B1
(45) Date of Patent: Sep. 9, 2008

(54) VARIABLE BIT-RATE ENCODING

(75) Inventors: Clinton A. Staley, Atascadero, CA (US); Darren Alexander Giles, Los Gatos, CA (US)

(73) Assignee: Autodesk, Inc., San Rafael, CA (US)

( * ) Notice: Subject to any disclaimer, the term of this patent is extended or adjusted under 35 U.S.C. 154(b) by 1805 days.

(21) Appl. No.: 09/672,352

(22) Filed: Sep. 28, 2000

(51) Int. Cl.
H04N 7/12 (2006.01)

(52) U.S. Cl. ............. 375/240.23; 375/240; 375/240.01; 375/240.03; 375/240.12

(58) Field of Classification Search ................. 375/240, 375/240.01, 240.02, 240.03, 240.04, 240.23, 375/240.12; 725/115
See application file for complete search history.

(56) References Cited

U.S. PATENT DOCUMENTS

| | | | |
|---|---|---|---|
| 5,091,782 A | 2/1992 | Krause et al. ................ 358/135 |
| 5,231,484 A * | 7/1993 | Gonzales et al. ........ 375/240.04 |
| 5,333,012 A * | 7/1994 | Singhal et al. .......... 375/240.04 |
| 5,452,104 A | 9/1995 | Lee .............................. 358/433 |
| 5,497,153 A | 3/1996 | Jeong ........................... 341/67 |
| 5,563,960 A | 10/1996 | Shapiro ........................ 382/239 |
| 5,576,767 A | 11/1996 | Lee et al. ..................... 348/413 |
| 5,638,126 A * | 6/1997 | Lim ....................... 375/240.03 |
| 5,686,963 A | 11/1997 | Uz et al. ...................... 348/404 |
| 5,699,457 A | 12/1997 | Adar et al. ................... 382/239 |
| 5,708,664 A | 1/1998 | Budge et al. ................. 370/538 |
| 5,734,677 A | 3/1998 | Liew et al. ................... 375/240 |
| 5,867,230 A | 2/1999 | Wang et al. .................. 348/845 |
| 5,969,764 A | 10/1999 | Sun et al. ..................... 348/404 |
| 5,990,955 A * | 11/1999 | Koz ....................... 375/240.01 |
| 5,999,655 A | 12/1999 | Kalker et al. ................ 382/234 |
| 6,008,847 A | 12/1999 | Bauchspies ................. 348/391 |
| 6,014,694 A | 1/2000 | Aharoni ....................... 709/219 |
| 6,038,256 A * | 3/2000 | Linzer et al. ........... 375/240.12 |
| 6,052,384 A | 4/2000 | Huang et al. ................. 370/468 |
| 6,151,362 A * | 11/2000 | Wang .................... 375/240.12 |
| 6,188,428 B1 * | 2/2001 | Koz et al. .................... 725/115 |

FOREIGN PATENT DOCUMENTS

WO   WO 00/03546   1/2000

OTHER PUBLICATIONS

International Search Report PCT/US01/3063, Dec. 14, 2001.

* cited by examiner

*Primary Examiner*—Allen Wong
(74) *Attorney, Agent, or Firm*—Gates & Cooper LLP

(57) ABSTRACT

A process encodes video or image data. The process includes estimating forms of a plurality of functions and estimating a best quality value for producing encoded frames with sizes that satisfy one or more constraints. Each function relates encoded size to encoded quality for an associated frame. Each frame has data for one or more images. The constraints are associated with transmission line bandwidth or receiver buffer size. The estimating a best quality value is based in part on the functions. The process also includes transmitting frames encoded with approximately the best quality value to a transmission line.

26 Claims, 4 Drawing Sheets

VARIABLE BIT-RATE ENCODING

TECHNICAL FIELD

The invention relates to video data encoders and decoders.

BACKGROUND

Data encoding enables digital images and videos to be compressed so that less data is needed to transmit the images or videos. To increase the amount of compression, lossy encoding can be used. Loosy encoding provides more compression at a price of some loss of image or video quality. The quality may be defined by a sum of root-mean-squared differences between relative illuminations of the original image and the image generated from encoded data, i.e., summed over the pixels entire image.

Some "lossy" encoders have control input terminals for setting either the amount of compression or the quality of the image obtainable from the encoded output data. Selecting a higher compression generally results in lower image or video quality. A reduction in image or video quality may also result from the transmission of the encoded data.

SUMMARY

In a first aspect, the invention features a process for encoding video or image data. The process includes estimating forms of a plurality of functions and estimating a best quality value for producing encoded frames with sizes that satisfy one or more constraints. The best quality value might assign the same quality to each frame, or may assign different qualities to each frame, in order to produce a best overall quality for a sequence of frames. Each function relates encoded size to encoded quality for an associated frame. Each frame has data for an image. The constraints are associated with such considerations as transmission line bandwidth, receiver buffer size and/or total size for the entire frame sequence. The estimating a best quality value is based in part on the functions. The process also includes transmitting a sequence of frames where the quality values for at least some of the frames have been determined based on the estimated best quality value.

In some embodiments, the process also includes encoding at least some of the frames of the sequence with the best quality value in response to estimating the best quality value.

In some embodiments, each act of estimating one of the forms also includes computing a plurality of pairs of encoded quality and encoded size values for each frame of the sequence from encoded frame data and determining a functional relationship between values of the encoded quality and the encoded size for the plurality of pairs of values. The act of computing may further include encoding each frame of the sequence with a plurality of qualities to compute encoded data sizes associated with each of the plurality of qualities. The acts of encoding a frame with the plurality of qualities may be performed in parallel.

In some embodiments, the estimating a best quality value further includes selecting an encoded quality of one of the plurality of frames and deciding whether the encoded size associated with the encoded quality satisfies a constraint based on transmission bandwidth, receiver buffering, or receiver prebuffering.

In some embodiments, the process may determine the encoded size associated with each encoded image quality from the functional relation between the encoded quality and the encoded size for the associated frame.

In a second aspect, the invention features a system for encoding image frames. The system includes a variable bit-rate encoder and a controller connected to receive data on sizes of image frames encoded by the encoder. The controller controls quality of the encoded frames produced by the encoder. The controller is capable of causing the encoder to generate encoded data at a rate responsive to one of a bandwidth of a transmission line and space in a receiver buffer.

In some embodiments, the controller is configured to determine a relation between quality of an encoded image frame and amount of encoded data from the received size data.

In some embodiments, the controller is configured to determine a best quality value for encoding an image frame from size data on data frames encoded with different qualities.

In a third aspect, the invention features a program storage media storing a program of computer executable instructions that cause a computer to perform one or more of the above-described processes.

Other advantages and features of the invention will be apparent from the following description of an embodiment thereof and from the claims.

DETAILED DESCRIPTION

Figure 1:
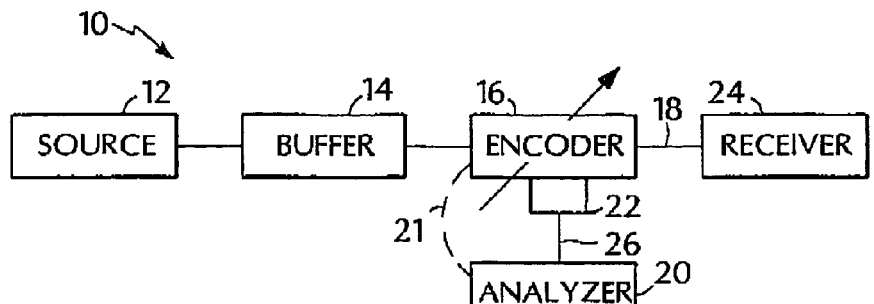
FIG. 1 is a high-level block diagram of a variable bit-rate encoder.

FIG. 1 is a high-level block diagram of one high-speed transmission system 10 for digital image or video data. The system 10 receives the video data frames from a source 12, e.g., a data storage device. The source 12 sends the data frames to a buffer 14. The buffer 14 transmits the data frames to a variable bit-rate encoder 16. The encoder 16 transmits encoded data frames to a transmission line 18 and feedback data to an analyzer 20, i.e., via line 26.

The encoded data frames are compressed with respect to data from the source 12. The encoded data frames have either a standard format, e.g., Motion Picture Experts Group (MPEG) or the Joint Photographic Experts Group (JPEG) formats, or a proprietary format, e.g., Sorenson compression format.

For each image frame, the encoder 16, permits control of the quality, Q, of the encoded data frame produced through control signals sent to terminal 22. Nevertheless, for a selected quality, Q, the encoder 16 may produce different amounts, S, of encoded data for each image frame. The frame-to-frame differences in the amounts, S, of produced encoded data are related to differences in image content. For image frames having more detail and/or associated with more object motion, the encoder 16 generally generates larger encoded data frames.

The feedback data from the encoder 16 indicates the amount, S, of encodes data produced for an associated image frame. The analyzer 20 uses the feedback data, i.e., values of S, to select the image quality, Q, produced by the encoder 16 on a frame-by-frame basis.

The analyzer 20 controls the encoder 16 by sending control signals to control terminal 22. The control signals determine whether encoded data frames are sent to the line 18 or simply used to generate feedback data. The control signals also set the quality, Q, of individual encoded frames from the encoder 16. The control signals set the quality, Q, of the encoder 16, to produce a "best quality sequence" for a sequence of frames in a scene, sometimes referred to as a clip. This might include, for example, the majority of frames in the sequence having a "best quality value," $Q_B$, (discussed in detail below) and higher quality values for the beginning and ending frames of a sequence. Higher qualities for the beginning and ending frame of a sequence can be useful, because these frames may be seen in still form during editing, and the beginning frames may fall after a cut in the movie and have greater visual impact. The best quality value, $Q_B$, is a value that is typically determined for an entire video program, and it is considered the best quality value for the series of frames in light of defined constraints, e.g., bandwidth constraints on transmission line 18, buffering and prebuffering constraints for receiver 24, and/or constraints on total size for the compressed program.

Figure 2:
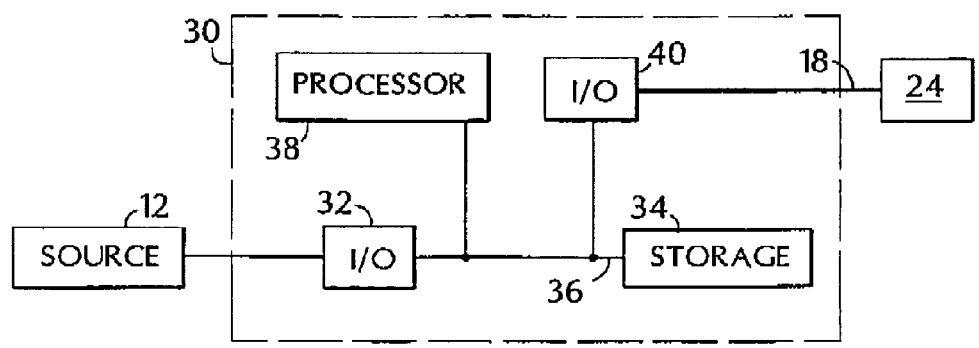
FIG. 2 is a high-level block diagram of a variable bit-rate encoder that is software based.

FIG. 2 shows an alternate data encoder 30 based on software. In the encoder 30, the source 12 connects to an input/output (I/O) controller 32 that stores received frames of data in a storage device 34. The I/O controller connects to the storage device 34 via a bus 36. The received data frames are analyzed by a processor 38. The processor 38 encodes each frame, determines an amount, S, of encoded data in the frame, and restores the encoded frame back in the storage device 34. The processor 38 also encodes received data frames to provide the best quality value, $Q_B$, over a sequence of frames in light of the bandwidth of the transmission line 18 and buffering and prebuffering constraints for the receiver 24. From the storage device 34, the encode data frames are sent to transmission line 18 by another I/O controller 40.

Referring to FIGS. 1 and 2, encoding algorithms generate different amounts, S, of data for each image frame, because the image content changes from frame to frame. The changes in the amount, S, of encoded data per frame lead to fluctuations in transmission rates for different frames of a video object such as a movie. These transmission rate fluctuations can cause problems for video viewing at the receiver 24. For example, a viewing gap may occur if transmission line 18 does not transmit subsequent frames fast enough or if a receiver buffer empties out, i.e., inadequate prebuffering. A viewing irregularity can also occur if encoded data exceeds receiver buffer capacities. The sizes S of data for the image frames, of course, also directly affect the total size of the compressed program.

Figure 3:
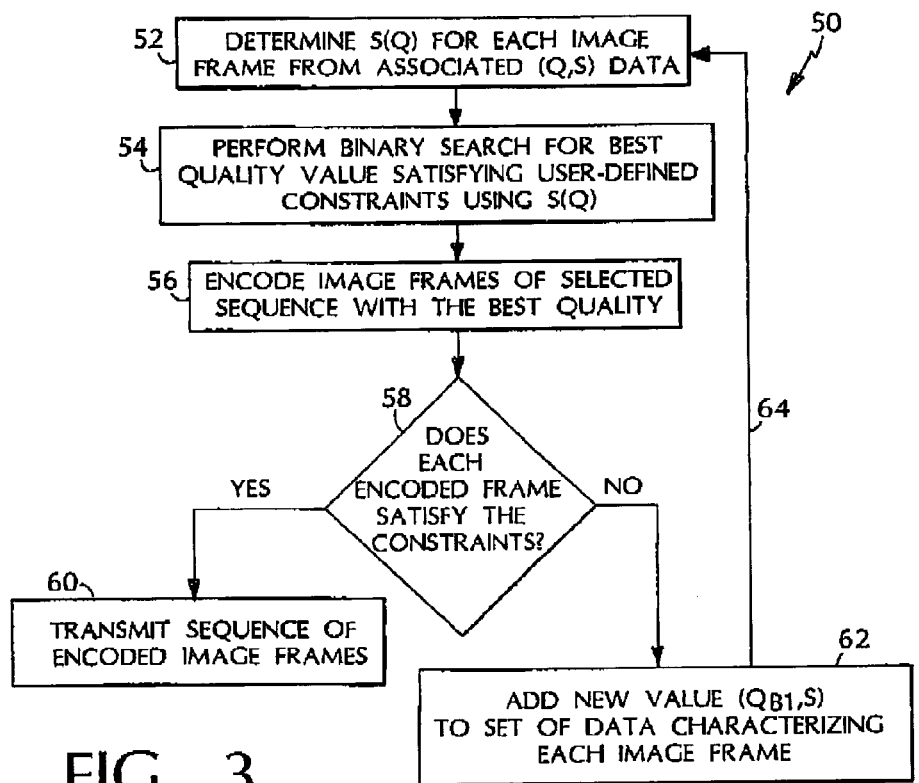
FIG. 3 is a flow chart for a process that encodes video objects and transmits the objects with a uniform quality.

To avoid gaps and irregularities, an encoder may be controlled to produce encoded data frames at a constant rate. But, producing encoded data at a constant rate leads to fluctuations in image quality, because encoding algorithms produce different amounts of encoded data for each image frame. Fluctuations in image quality can disturb viewers. To avoid such fluctuations, an encoder can be operated so that image quality for the majority of frames remains constant in light of constraints based on transmission bandwidth and receiver buffering and prebuffering. As noted above, it may be desirable to have the beginning and ending frames encoded at a higher quality than other frames, and there may be other reasons to make variations from a uniform quality value FIG. 3 illustrates a process 50 that determines a best quality value, $Q_B$, for encoding video. The process 50 may operate on encoders 10, 30 of FIGS. 1 and 2 and may produce data encoded in various formats, e.g., MPEG, JPEG, or proprietary formats.

For a selected sequence of image frames, the process 50 determines a separate function, S(Q), relating quality, Q, to amount, S, of encoded data for each image frame (step 52). The process 50 determines S(Q) for each image frames of the sequence using a set of data points {(Q,S)} associated to the frame and an interpolation process. Based on the function S(Q), the process 50 iteratively performs a binary search (or other subdividing search mechanism) to find a best quality value, $Q_{B1}$, for which the sequence of frames satisfies the user-defined constraints, e.g., transmission line constraints, receiver constraints and/or total size constraints (step 54). The user-defined constraints impose limits on the amount, S, of encoded data per frame and are associated with the bandwidth of the transmission line, buffering and prebuffering characteristics of the target receiver, and/or total size of compressed data. As described below, other search techniques can be used in place of a binary search.

The process 50 encodes each frame of the entire sequence with the value of the best quality value, $Q_{B1}$ found through the binary search (step 56). The process 50 checks whether each encoded data frame actually satisfied the constraints of the transmission line and target receiver (step 58). The check includes calculating the actual amount, S, of data produced for each frame when encoded with the quality $Q_{B1}$. To calculate the amount of data, the process 50 actually encodes each frame at the quality $Q_{B1}$ and determines how much data is produced. If each encoded data frame actually satisfies the constraints, the process 50 can then actually transmit the sequence of encoded image frames to the transmission line and receiver (step 60).

If one or more of the encoded frames does not satisfy the constraints, the process 50 adds the calculated ($Q_{B1}$,S) to the set {(Q,S)} of data points previously used to define the function S(Q) for each frame (step 62). Then, the process 50 loops back 64 to determine new S(Q)'s, i.e., based on the new set {(Q,S)} and to find a new best quality value, $Q_{B2}$. Since the new point ($Q_B$,S) is generally closer to the "actual" best quality value, $Q_B$, the new functions S(Q)'s ordinarily produce a better approximation to the actual $Q_B$. Thus, performing the loop 64 once or twice usually generates a quality satisfying the constraints from the transmission line and receiver buffer.

Figure 4:
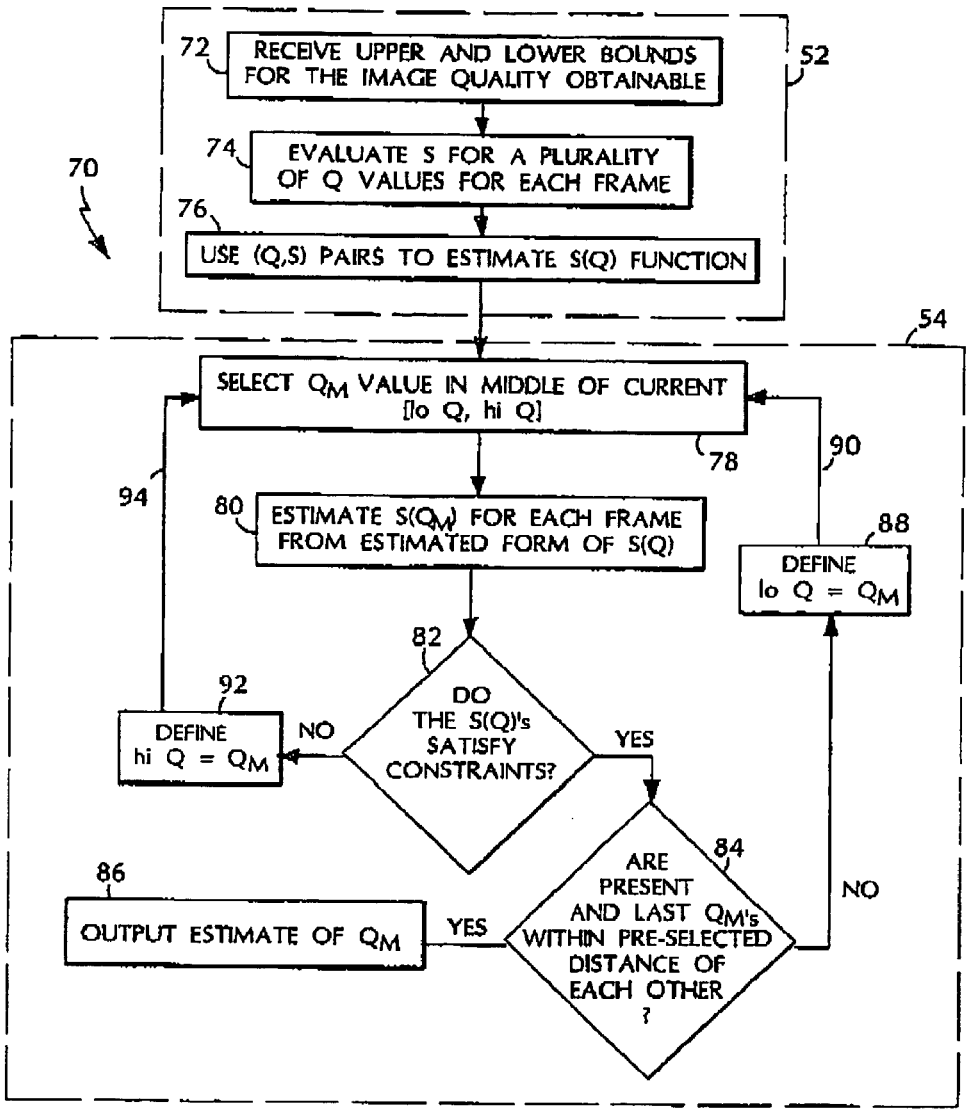
FIG. 4 is a flow chart for a process that determines a "best" transmission quality value for video objects.

FIG. 4 shows a process 70 that determines a best quality value, $Q_{B1}$, for decoding a selected sequence of image frames, i.e., steps 52, 54 of FIG. 3. The process 70 receives upper and lower bounds on the quality, Q, of the image quality that the encoder can produce by encoding an image frame (step 72). The values of the bounds may be stored in a data storage device or entered by an operator. Next, the process 70 encodes each image frame of the selected sequence for a plurality of Qs and evaluates the amount, S, of encoded data produced each time the image frame is encoded (step 74). The values of the Qs are chosen to be within the upper and lower quality bounds of the encoder. For each image frame, the process 70 obtains a set of calculated (Q,S) pairs that indicate a relationship between the quality, Q, of the image produced from the encoded data and the amount, S, of encoded data need to generate an image of that quality, Q.

For each selected quality Q, the amount, S, of encoded data varies from frame to frame, because the content of each image changes in a frame-to-frame fashion. The content changes may include differences in motion and image detail. The differences in the content of each image change the amount of data, S, need to encode the image to a selected image quality.

The set of Q values covers the range between the upper and lower bound to indicate the behavior of S(Q). The process 70 uses the measured (Q,S) pairs to estimate the form of the function S(Q) (step 76). For example, the process 70 may use a Catmull-Rom curve fitting algorithm to estimate the form of S(Q). Generally, S(Q) is a monotonic function of Q, i.e., higher selected qualities require more encoded data for the same image frame.

The process 70 also performs a binary search (or other search) for the best quality value, $Q_B$, i.e., step 54 of FIG. 3. To start the search, the process 70 selects a value of the quality, $Q_M$, part way (midway for a binary search) between the low and high values (hiQ and loQ) for the quality of encoded frames of the selected sequence (step 78). Initially the high and low qualities, hiQ and loQ, are the upper bound and lower bound for qualities obtainable from the encoder. For the selected value $Q_M$, the process 70 uses the estimated form of the function S(Q) to determine an "estimated" encoded data size, $S_M$, for each image frame in the selected sequence (step 80). By using the function S(Q), the process 70 estimates the amount, $S_M$, of data produced by encoding each frame of the selected sequence with quality, $Q_M$. The process 70 saves substantial computational effort that is otherwise needed to encode each image frame prior to determining the amount, $S_M$, of data in the encoded data frames produced therefrom. Next, the process 70 uses a model to determine whether each estimated data size, $S_M$, satisfies the user-defined constraints, e.g., based on transmission line constraints, receiver constraints and/or total size constraints (step 82).

The model simulates constraints on amounts of encoded data, S, which are imposed by the transmission line and the receiver's input buffer and/or the total size constraint. The transmission line has a bandwidth that limits the rate at which encoded data can be transmitted to the receiver without loss, i.e., limiting the amount of data produced by encoding each image frame. The size of the receiver buffer imposes both buffering and prebuffering constraints. The buffering constraint limits the amount of encoded data that can be accepted by the receiver without loss resulting from insufficient buffer space to store incoming data prior to decompression and play, i.e., also limiting the amount of encoded data per image frame. The prebuffering constraint limits the amount of data that may be sent before the first group of pictures (GOP) is removed from the receiving buffer and displayed. The viewer at the receiving end perceives this as a delay before display begins, so prebuffering must be limited to a small amount of time.

For simple constraints, the algorithm operates by directly determining, via a closed-form equation, whether the $S_M$ values satisfy the constraints. For more complex constraints, the algorithm simulates the process of transmitting, receiving, and displaying the frames at a level of detail sufficient to determine whether the constraints are met. Such a level of detail can readily be simulated at low cost, since the actual data need not be compressed, transmitted, nor uncompressed. The simulation simply tracks the size and timing of data transfers that would occur in actual transmission, without modelling the detailed data content.

The state of the receiver buffer depends on both the buffering and prebuffering constraints. The model simulates the time-evolving state of the buffer to determine whether a sequence of data amounts, S, for encoded data frames either overfills the receiver buffer or results in an empty receiver buffer when data is needed at the receiving end for the next GOP. The model assumes that the buffer is initially empty, but may allow for a certain amount of buffer filling, prebuffering, prior to simulating the removal of data from the receiver buffer.

The total size constraint can be a particular concern for offline or archival compression.

If the constraints are satisfied, the process 70 determines whether the present and last estimates for the best quality value, $Q_B$, are within a predetermined distance of each other (step 84). If the two estimates are within the distance of each other, the process 70 outputs the estimate for $Q_B$ (step 86). If the estimates are not within the preselected distance, the process 70 resets the lower bound for the best quality value, loQ, to $Q_M$ (step 88). Then, the process 70 loops back 70 to select a quality that is partway (halfway if using binary search) between the present upper and lower bounds as the next estimate for best quality value, $Q_B$. The last estimate for $Q_B$, i.e., $Q_M$, has become the new lower bound, loQ, for the best quality value in the next iteration of the binary search.

If the constraints are not satisfied, the process 70 selects $Q_M$ to be the new upper bound for the best quality value (step 92). Then, the process 70 loops back 94 to select a new estimate for the best quality value $Q_B$ that is partway (halfway if binary) between the new upper and lower bounds, e.g., (loQ+hiQ)/2 if binary. The search algorithm rapidly converges to a estimate of the best quality value, $Q_B$, with the preselected range of the actual best value.

In some embodiments, the process 70 of FIG. 4 is performed in two stages. In a first stage, a coarse set of (Q,S) data pairs is obtained for each image frame of the selected sequence, and a coarse estimate is made of S(Q) as shown in steps 74 and 76. The coarse estimate of S(Q) is used to obtain a coarse estimate of the best quality value, $Q_B$, by performing the search of step 54. In a second stage, a new set of (Q,S) data points is found, similarly to step 74. The new set is however, found by encoding image frames of the selected sequence for new values of Q, which are located near the coarse estimate of $Q_B$. From the new data points (Q,S), a new estimate of S(Q) is obtained near the coarse estimate of $Q_B$, similarly to step 76. Near the coarse estimate to $Q_B$, the new estimate to S(Q) is generally much better than the coarse estimate to S(Q), because the new estimate is based on many data points (Q,S) located near the coarse estimate of $Q_B$. Then, a new search algorithm is performed to determine a new estimate of $Q_B$ based on the new estimate of S(Q). The second stage usually produces a good estimate of $Q_B$ because of the better estimate of S(Q).

Figure 5:
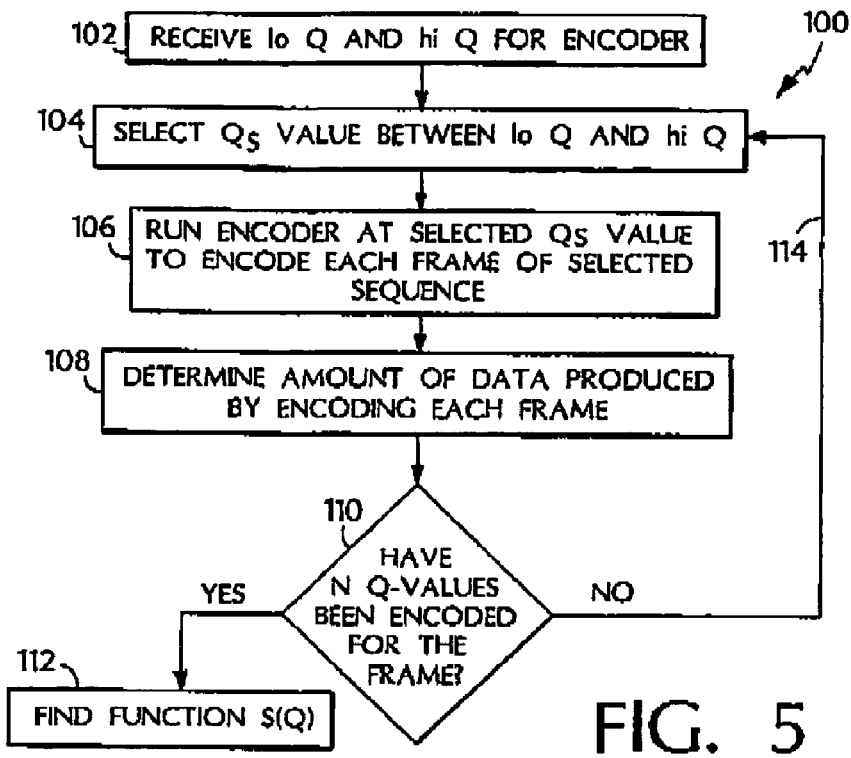
FIG. 5 is a flow chart for a process that determines frame-by-frame quality-size functions for use in determining the best uniform transmission qualities.

FIG. 5 is a flow chart illustrating a process 100 that estimates the function, S(Q), used by process 70 of FIG. 4 to determine the best quality value, $Q_B$. The process 100 receives upper and lower bounds for qualities of encoded frames obtainable from the encoder (step 102). The process 100 selects a quality value, $Q_S$, between the upper and lower bounds (step 104). The selected value may be a random point between the upper and lower bounds or a point with a preselected location with respect to the two bounds. The process 100 encodes each frame of the selected sequence of image frames with the selected quality, $Q_S$ (step 106). The encoding of each frame of the sequence is a computationally expensive step. The process 100 separately computes the amount of data, S, produced by encoding each individual frame at quality, $Q_S$ (step 108). The computation yields a data pair ($Q_S$, S) for each frame of the selected sequence. The process 100 determines whether a preselected number, N, of data pairs (Q, S) has been computed for each image frame of the selected sequence (step 110). If N values have been computed, the process uses the data pairs (Q, S) to estimate the functional form of S(Q) (step 112). To estimate the functional form of S(Q) Catmull-Rom curve fitting may be performed so that the resulting estimate is a continuously differentiable curve. If N values have not been computed, the process 100 loops back 114 to select a new quality value, $Q_S'$, and repeat the determination of another data pair $(Q_S', S)$.

In some embodiments, steps 104-112 are performed for a plurality of values, $Q_{S1} \ldots Q_{SN}$, in parallel instead of serially. These steps are computationally slow, because each image frame of the selected sequence is encoded multiple times— each encoding of an image frame is computationally slow. Performing the needed frame encodings in parallel can produce an important increase in the speed of the process 100 for estimating S(Q).

Figure 6:
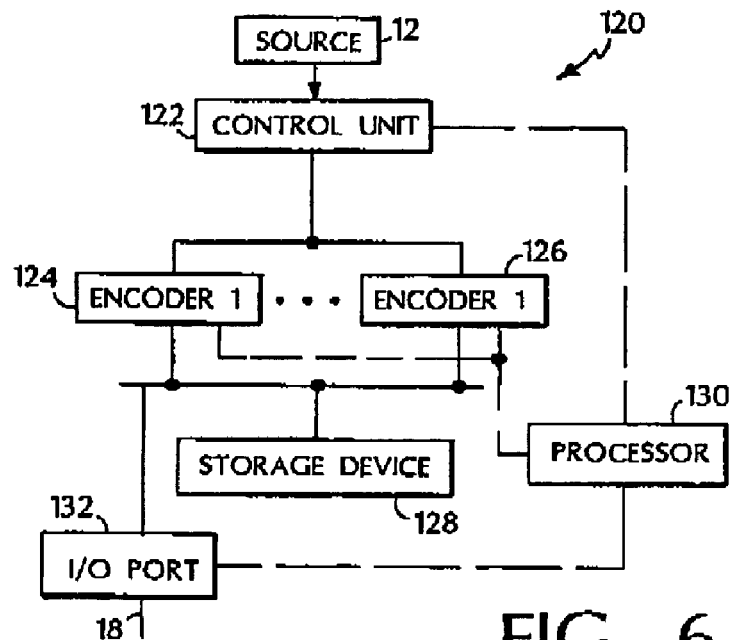
FIG. 6 is a high-level block diagram of an alternate system that performs variable rate encoding.

Referring to FIG. 6, a system 120 that performs image— frame encodings of steps 104-112 in parallel is shown. In the system 120, a control unit 122 sends each image frame simultaneously sent to a plurality of hardware encoders 124-126. Each hardware encoder 124-126 encodes the received image frames to produce encoded data frames of a fixed quality, $Q_{S1} \ldots Q_{SN}$ and stores the encoded frames in a storage device 128. The encoders 124-126 provide data on amounts of encoded data produced for each image frame to a processor 128. The processor 128 is configured to perform processes 50, 70, and 100 of FIGS. 3-5 to determine the best quality value for encoding image frames. The processor 128 transmits image frames encoded with the best quality value 130 to transmission line 18 via an I/O port 132.

Performing the final compression at the best quality value, i.e., step 58 of FIG. 3, doubles the time needed to encode a sequence of image frames with the system 120 of FIG. 6. Instead of performing the final encoding at the best quality value, $Q_B$, the system 120 may select the encoded data frames for the quality value closest to the determined best quality value, $Q_B$, for the encoded data frames produced at step 58. The appropriate data frames are already produced while determining the best quality value, $Q_B$.

Other embodiments are within the scope of the following claims. For example, instead of doing a search for the best quality value, $Q_B$, by a binary search, one can use another search mechanism, e.g., another search mechanism that reduces the search range by subdivision. Some variants of the binary search include picking a dividing point for the current range that is not centered exactly, but falls at an interpolated point in the range. For instance, if the bottom and top ends of a range have sizes 50 and 100, and if one is looking for a size of 60, one might choose a dividing point closer to the bottom than to the top end of the range.

What is claimed is:

1. A process for encoding data, comprising:
   determining a separate function for each frame in a sequence of frames, each function relating encoding size to encoded quality for each frame in the sequence of frames, each frame having data for an image;
   prior to encoding any of the frames, performing a search of all of the separate functions to determine a best quality value for encoding the sequence of frames, whose encoded sizes satisfy one or more constraints, the constraints being associated with one of a transmission line bandwidth, a receiver buffer size and total compressed size;
   encoding each frame of the entire sequence of frames with the determined best quality value;
   determining whether each encoded frame satisfies the constraints; and
   if the encoded frames satisfy the constraints, transmitting the sequence of encoded frames.

2. The process of claim 1, wherein the search reduces the search range for said best quality value by subdivision.

3. The process of claim 1 wherein said search is a subdivision search algorithm.

4. The process of claim 1 wherein said search is a binary search algorithm.

5. The process of claim 1, wherein each encoded frame produces a group of temporally encoded pictures.

6. The process of claim 1, wherein each act of determining a separate function, further comprises:
   computing a plurality of pairs of encoded quality and encoded size values for each frame of the sequence from encoded frame data; and
   determining a functional relationship between values of the encoded quality and the encoded size for the quality of frames from the pairs of values.

7. The process of claim 6, wherein the computing further comprises:
   encoding each frame of the sequence with a plurality of qualities to computer encoded data sizes associated with each of the plurality of qualities.

8. The process of claim 7, wherein the transmitting comprises:
   selecting the one of the plurality of qualities having a closest value to the best quality value; and
   wherein the transmitting sends frames encoded with the selected quality.

9. The process of claim 1, wherein the determining of separate functions is performed across the sequence of frames on multiple processors in parallel.

10. The process of claim 1, wherein the determining of a best quality value further comprises:
    selecting an encoded image quality of one of the plurality of frames; and
    deciding whether the encoded size associated with the encoded image quality satisfies a constraint based on one of transmission bandwidth, receiver buffering, total compressed size, and receiver prebuffering.

11. The process of claim 10, wherein the deciding is based on two of the transmission bandwidth, receiver buffering, and receiver prebuffering.

12. The process of claim 10, further comprising:
    determining the encoded size associated with each encoded image quality from the form of the functional relation between the encoded quality and the encoded size for the associated frame.

13. The process of claim 1 wherein if one of more of the encoded frames do not satisfy the constraints:
    determining a new separate function based on the prior separate function determining and search; and
    repeating the performing a search, encoding, and determining whether each encoded frame satisfies the constraints steps based on the new function.

14. A system for encoding image frames, the system comprising:
    (a) a controller connected to receive data on sizes of image frames that are part of a sequence of image frames, to be encoded by the encoder and to control quality of the encoded frames produced by the encoder based on:
       (i) a determination of a separate function for each image frame in the sequence of image frames, each function relating encoding size to encoded quality for each frame in the sequence of frames;
       (ii) a search of all of the separate functions to determine a best quality value for encoding the sequence of frames whose encoded sizes satisfy one or more constraints, the constraints being associated with one of a bandwidth of a transmission line, space in a receiver buffer and a total compressed size; and (b) a variable bit rate encoder controlled by the controller configured to encode each frame of the entire sequence of frames with the determined best quality value, wherein the controller is further configured to determine whether each encoded frame satisfies the constraints, and if the encoded frames satisfy the constraints, transmitting the sequence of encoded frames.

15. The system of claim 14, wherein the controller is configured to determine a relation between quality of an encoded image frame and amount of encoded data from the received size data.

16. The system of claim 14, wherein the controller is configured to determine a best quality value for encoding an image frame from size data on data frames encoded with different qualities.

17. The system of claim 14 wherein if one of more of the encoded frames do not satisfy the constraints, the controller:
   determines a new separate function based on the prior separate function determining and search;
   repeats the search of all of the frames;
   causes the encoder to encode each frame of the entire sequence based on the new form; and
   repeats the determining of whether each encoded frame satisfies the constraints.

18. The system of claim 14, wherein the controller is configured to determine the separate functions across the sequence of frames on multiple processors in parallel.

19. A computer readable storage media storing a computer program including executable instructions, the instructions to cause a computer to:
   determine a separate function for each frame in a sequence of frames, each function relating encoded size to encoded quality for each frame in the sequence of frames, each frame having data for an image;
   prior to encoding any of the frames, perform a search of all of the separate functions to determine a best quality value for encoding the sequence of frames whose encoded sizes satisfy one or more constraints, the constraints being associated with one or more of a transmission line bandwidth, a receiver buffer size and a total size constraint;
   encode each frame of the entire sequence of frames with the determined best quality value;
   determines whether each encoded frame satisfies the constraints; and
   if the encoded frames satisfy the constraints, order transmission of frames of the sequence.

20. The media of claim 19 wherein said search is a binary search algorithm.

21. The media of claim 19, wherein each encoded frame produces a group of temporarily encoded pictures.

22. The media of claim 19, wherein each instruction to determine a separate function, further causes the computer to:
   compute a plurality of pairs of encoded quality and encoded size values for each frame of the sequence from encoded frame data; and
   determine a functional relationships between values of the encoded quality and the encoded size for the plurality of frames from the pairs of values.

23. The media of claim 22, wherein the instruction to compute further causes the computer to:
   encode each frame of the sequence with a plurality of qualities to computer encoded data sizes associated with each of the plurality of qualities.

24. The media of claim 19, wherein the instruction to determine a best quality value, further causes the computer to:
   select an encoded image quality of one of the plurality of frames; and
   decide whether the encoded size associated with the encoded image quality satisfies a constraint based on one of transmission bandwidth, receiver buffering, and receiver prebuffering.

25. The media of claim 19 wherein if one of more of the encoded frames do not satisfy the constraints, the instructions cause the computer to:
   determine a new separate function based on the prior separate function determining and search; and
   repeat the performing a search, encoding, and determining whether each encoded frame satisfies the constraints steps based on the new function.

26. The media of claim 19, wherein the instructions cause the computer to determine the functions across the sequence of frames on multiple processors in parallel.

* * * * *